N. OGDEN.
AUTOMATIC DISINFECTING CLOSET.
APPLICATION FILED OCT. 1, 1909.
984,696.
Patented Feb. 21, 1911.
2 SHEETS—SHEET 1.
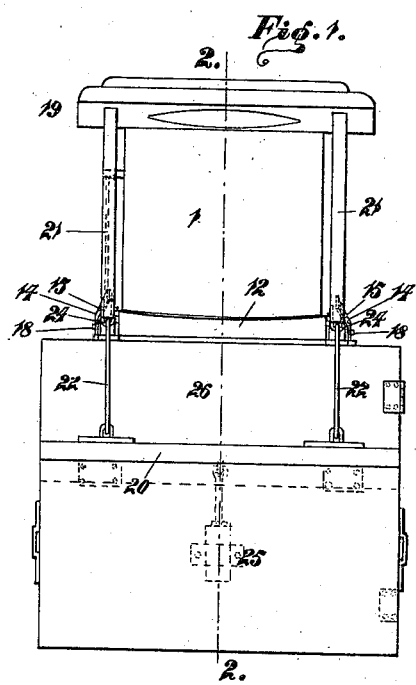
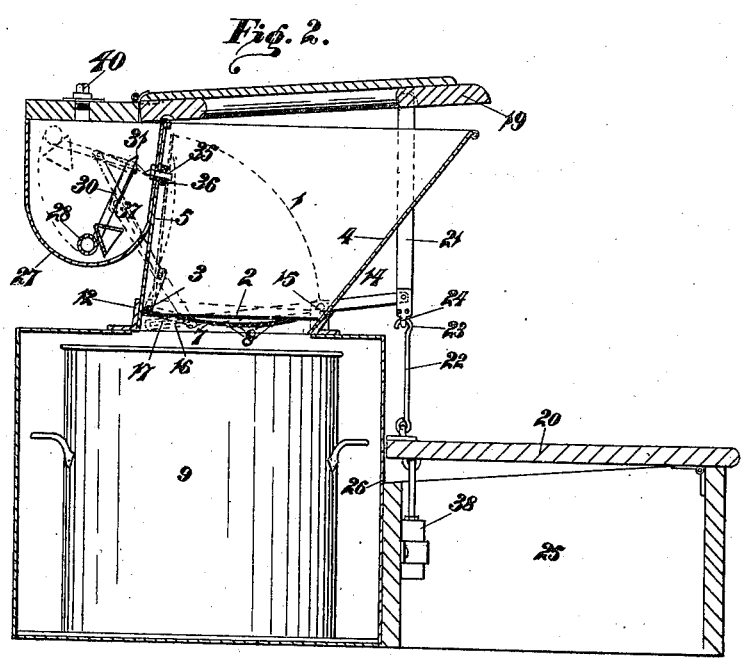
Witnesses
H. J. McMillan.
E. Hall.
Inventor
Norman Ogden
by Ridout & Maybee
attys.

N. OGDEN.
AUTOMATIC DISINFECTING CLOSET.
APPLICATION FILED OCT. 1, 1909.
984,696.
Patented Feb. 21, 1911.
2 SHEETS—SHEET 2.
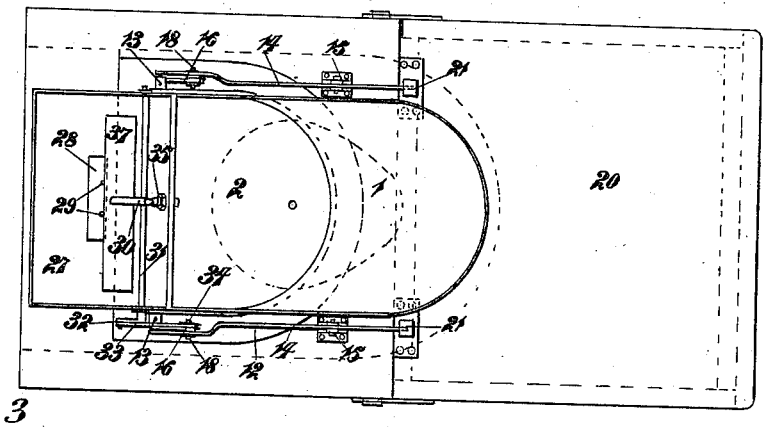
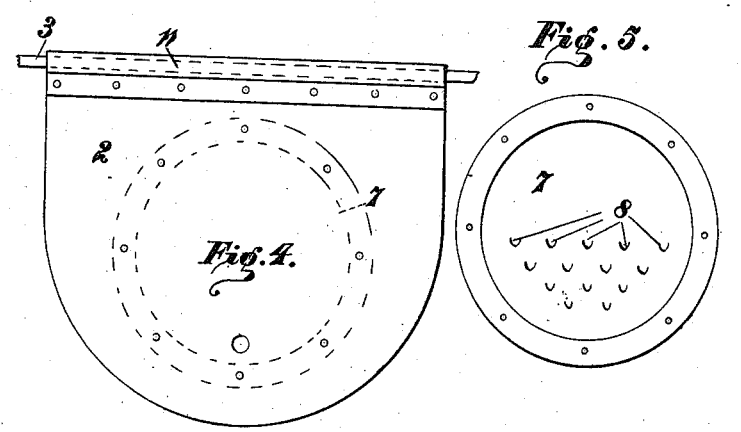
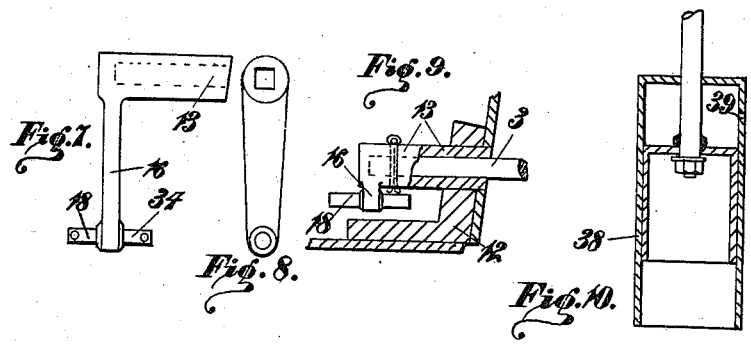
Witnesses
W. J. McMillan
E. Hall.
Inventor
Norman Ogden.
by Ridout & Maybee
attys.

UNITED STATES PATENT OFFICE.

NORMAN OGDEN, OF BRUNSWICK, NEAR MELBOURNE, VICTORIA, AUSTRALIA, ASSIGNOR TO ARTHUR ECKERSLEY, OF MELBOURNE, AUSTRALIA.

AUTOMATIC DISINFECTING-CLOSET.

984,696.  Specification of Letters Patent.  Patented Feb. 21, 1911.

Application filed October 1, 1909. Serial No. 520,468.

*To all whom it may concern:*

Be it known that I, NORMAN OGDEN, a citizen of the Commonwealth of Australia, and residing at 4 Bennie street, Brunswick, near Melbourne, Victoria, Australia, have invented certain new and useful Improved Automatic Disinfecting - Closets, of which the following is a specification, reference being had therein to the accompanying drawings.

This invention has been devised in order to provide a simple closet which will automatically supply and discharge a certain quantity of disinfectant into the soil pan each time the closet is used and which will automatically close down a platen or flapper valve when the closet is not in use and thus seal or close up the bottom of the closet pan, thereby preventing the entrance of flies to the night soil pan and closing the latter from view.

In order that the invention may be readily understood, it will be described by reference to the accompanying drawings, in which—

Figure 1 is a front elevation of a closet constructed in accordance with this invention. Fig. 2 is a vertical, transverse section of said closet, while Fig. 3 is a plan thereof with the lid or cover removed. Fig. 4 is a plan, and Fig. 5 an underside view of part of the platen or flapper valve above referred to, while Fig. 6 is a central section of said platen or flapper valve. Figs. 7 to 10 are views illustrating various details hereinafter referred to.

The same reference numerals indicate the same parts in all the figures.

In the lower part of the closet pan 1 is a platen or flapper valve 2 mounted upon a spindle 3 extending across the back of said pan and mounted in bearings on either side thereof. This platen or flapper valve is arranged so that it normally closes the bottom of the closet pan 1. For this purpose it is preferably made approximately D-shaped in plan as indicated in Fig. 4 and the closet pan is also made of a corresponding shape, that is its front side 4 is preferably rounded and flared outwardly toward the top while the rear or back 5 of the pan is flat so that the platen or flapper valve 2 when raised into its open position, as indicated in dotted lines in Fig. 2, can lie snugly back against or nearly against it and when in this position will effectually protect the back of the closet pan from pollution.

The platen or flapper valve 2 is made hollow or is otherwise formed with a chamber or compartment 6 as indicated in Figs. 4, 5 and 6. For this purpose the said platen may be made double or it can, as indicated in said figures, be provided with a dished or saucer shaped plate 7 attached by riveting or otherwise to the underside of the platen. This dished plate 7 is provided with a few perforations 8 in order to deliver a certain quantity of disinfectant into the soil pan 9 each time the closet is used. These perforations are preferably made on the louver principle as shown in Fig. 6 so that they will not be liable to be choked up with excreta.

The spindle 3 is attached or connected to the platen 2 in any convenient manner. Preferably said spindle is made square or otherwise sided in section and is passed through a correspondingly shaped socket 11 in the back edge of the platen, said socket being preferably made by bending back the rear part of the plate forming the body or base of said platen.

The bearings for the spindle 3 of the platen are formed in the sides of the closet pan 1. These bearings may be conveniently formed in a piece of angle iron 12 secured to or alongside the lower part of the closet pan. If said spindle is square or otherwise sided, it may be provided at either end with small sleeves 13 where it passes through said bearings as indicated in Figs. 7, 8 and 9.

Means are provided for automatically raising the platen or flapper valve 2 into its open position (indicated by dotted lines in Fig. 2) when the closet is in use. A convenient gear for the purpose is illustrated in the drawings. It comprises a pair of levers 14 fulcrumed in suitable supports 15 on either side of the closet pan and connected to or engaging with projecting arms 16 on either end of the platen spindle 3. The rear ends of the levers 14 may be slotted as indicated at 17 in Fig. 2 and be arranged to engage with laterally projecting pins 18 on the ends of the arms 16 either direct or by means of connecting rods or other suitable connections as will be readily understood.

The front ends of the levers 14 are adapted to be operated upon by the depression of either the seat 19 of the closet, or of a footboard 20 mounted in front thereof. For this purpose the front ends of said levers 14 are connected with said seat and footboard by means of a wooden or other rod 21 and a rod, chain, or other suitable connection 22. These latter connections may be provided with hooks 23 adapted to be engaged with eyes 24 on the lower ends of the rods 21 so that they can readily be disconnected therefrom when it is required to remove the footboard 20 with its supporting box or case 25 in order to withdraw the soil pan 9 through the doorway 26 provided for that purpose. This disconnection is of course unnecessary where facilities can be provided for withdrawing the soil pan from one of the sides or the back of the closet.

27 represents a trough or receptacle which is attached to the back of the closet pan 1 either by having its front edge hooked over the back of said pan as illustrated in Fig. 2 or by being bolted or otherwise fastened thereto. It is adapted to contain a supply of any suitable liquid disinfectant and is preferably rounded at the bottom for simplicity of construction and in order that the disinfectant may be used up without undue waste. The disinfectant supplied to the hollow platen or flapper valve 2 is elevated, each time the closet is used, by means of a ladle 28 consisting preferably of a short piece of tubing with holes 29 in its upper side. This ladle measures a regular quantity of disinfectant and is secured upon the end of a short hollow arm or small tube 30 which is mounted upon a rock-bar or spindle 31 mounted in bearings in the ends of the disinfectant reservoir 27 and provided at one end with a projecting arm 32 connected by a rod 33 with a pin 34 upon one of the arms 16, which, as above mentioned, are mounted upon the platen spindle 3. The delivery end of the tube 30 is arranged to discharge into another tube or spout 35 projecting through the back of the closet and secured thereto by nuts as shown or otherwise. A rubber washer or buffer 36 may be mounted upon this tube 35 in order to deaden the impact of said platen when raised into its open position. In order to act as a check upon the downward movement of said platen so that it will close down in the pan comparatively quietly a dash plate or damper 37 is mounted upon the hollow arm or tube 30 of the disinfectant ladle so that it will offer a certain amount of resistance when lowered into the disinfectant. This dash or damper plate will also keep the disinfectant in the required state of agitation and will, to a certain extent, serve to notify the users of the closet when the disinfectant reservoir requires replenishing.

A dash-pot 38 which may be constructed as illustrated in Fig. 10 may be connected with the footboard 20 or other moving part of the closet to serve as a check to the downward movement of the platen 2. It may be employed either instead of or in addition to the dash or damper plate 37. The construction illustrated in Fig. 10 is a convenient one for the purpose and consists simply of a piece of tube working inside another one and the outer tube being fitted with an air escape vent 39 near its upper end. The dash pot must of course be supported so that it has a certain amount of play to allow it to conform to the movement of the footboard.

Other means may be provided, either instead of or in addition to the dash or damper plate, for indicating when the disinfectant reservoir requires to be refilled. For instance, a float may be used to operate a small indicator carrying a notification that the reservoir requires to be refilled. This latter operation may be conveniently done through a plugged orifice 40 (Fig. 2) provided for the purpose in the reservoir.

A closet constructed as above described will automatically be opened as soon as a person steps upon the footboard 20 or sits down upon the seat 19. The platen or flapper valve 2 will thereby be turned up against the back of the pan and will cover or protect the back of said pan from being soiled. The same operation will cause the ladle 28 to swing upward into the position indicated by dotted lines in Fig. 2 when the measured quantity of disinfectant contained in the ladle 28 will flow down the hollow arm 30 into the short tube or spout 35 and will be delivered into the hollow platen or flapper valve. Some of it will pass out through the holes 8 in said platen and the remainder will subsequently be discharged through said holes when the platen or flapper valve returns to its closed position.

What I do claim as my invention, and desire to secure by Letters Patent, is:—

1. In an automatic disinfecting closet, the combination of a bowl; a movable hollow disinfectant-delivering valve normally closing said bowl; a part movable by the weight of a user adapted to open said valve; and means for automatically discharging a supply of disinfectant into said valve each time the closet is used.

2. In an automatic disinfecting closet the combination of a bowl; a movable hollow disinfectant-delivering valve normally closing said bowl; a part movable by the weight of a user adapted to open said valve; and means for automatically discharging a supply of disinfectant into said valve each time the closet is used, comprising a disinfectant tank, a ladle movable therein adapted when raised to discharge its contents into the hollow valve; and connections whereby said ladle is automatically raised when the valve is raised.

3. In an automatic disinfecting closet the combination of a bowl; and a movable, hollow, disinfectant-delivering valve therefor comprising a valve plate having an inlet opening therein, and a dished perforated plate secured to the underside of the valve plate.

4. In an automatic disinfecting closet the combination of a bowl; and a movable, hollow, disinfectant-delivering valve therefor comprising a valve plate having an inlet opening therein, and a dished plate secured to the underside of the valve plate and having louver-shaped discharge openings therein.

5. In an automatic disinfecting closet the combination of a bowl; a movable hollow disinfectant-delivering valve normally closing said bowl; a part movable by the weight of a user adapted to open said valve; and means for automatically discharging a supply of disinfectant into said valve each time the closet is used, comprising a disinfectant tank, a ladle movable therein adapted when raised to discharge its contents into the hollow valve, and connections whereby said ladle is automatically raised when the valve is raised; and a dash-plate movable with the dipper in the aforesaid tank.

6. In an automatic disinfecting closet the combination of a bowl; a movable hollow disinfectant-delivery valve normally closing said bowl a part movable by the weight of a user adapted to open said valve; means for automatically discharging a supply of disinfectant into said valve each time the closet is used; and a dashpot arranged to check the closing movement of said valve.

In witness whereof I have hereunto set my hand in the presence of two witnesses.

NORMAN OGDEN.

Witnesses:
WILLIAM ARMSTRONG,
PERCY HEDGES.